H. W. HILL, E. D. TILLYER AND H. H. STYLL.
OPHTHALMIC LENS.
APPLICATION FILED JAN. 2, 1917.
1,315,667.
Patented Sept. 9, 1919.
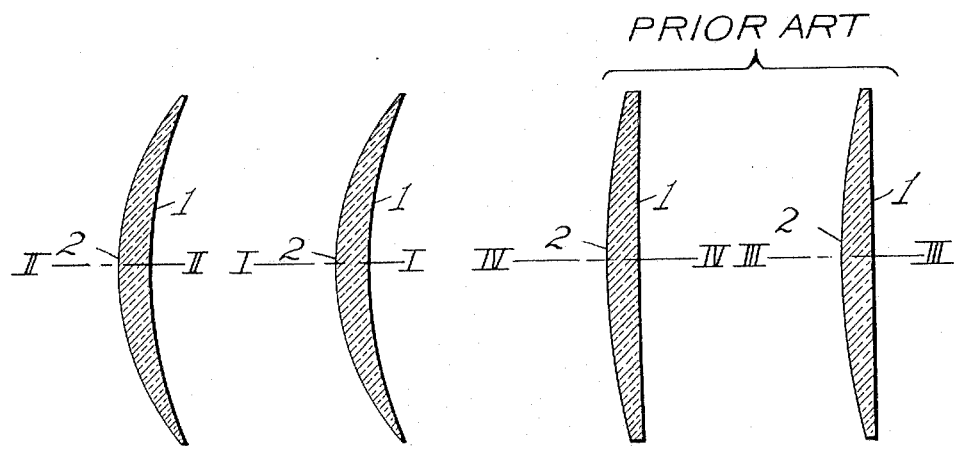
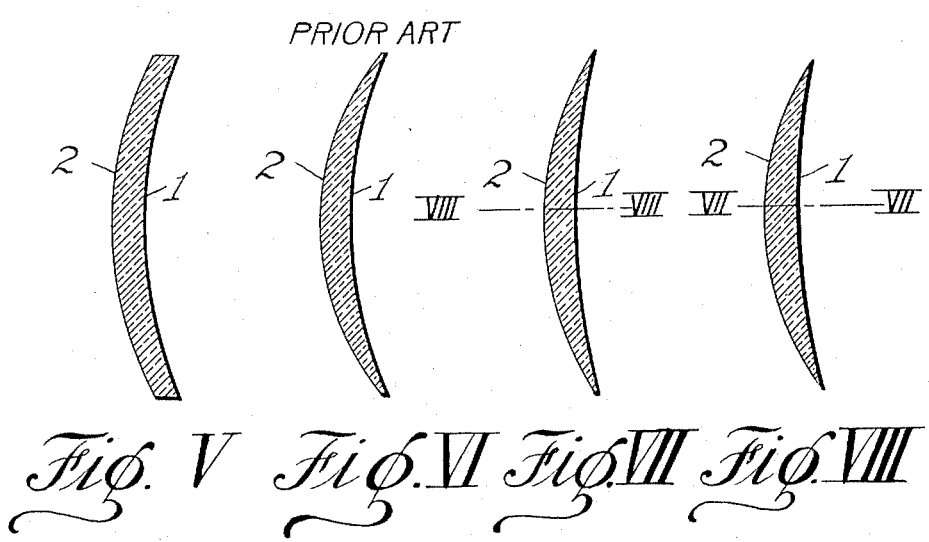
INVENTORS
HARRY W. HILL, EDGAR D. TILLYER
AND HARRY H. STYLL
BY
H. H. Styll, H. K. Parsons
ATTORNEYS

UNITED STATES PATENT OFFICE.

HARRY W. HILL, EDGAR D. TILLYER, AND HARRY H. STYLL, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

1,315,667.  Specification of Letters Patent.  Patented Sept. 9, 1919.

Application filed January 2, 1917. Serial No. 140,094.

*To all whom it may concern:*

Be it known that we, HARRY W. HILL, EDGAR D. TILLYER, and HARRY H. STYLL, citizens of the United States, residing at Southbridge, in the county of Worcester and State of Massachusetts, have invented certain new and useful Improvements in Ophthalmic Lenses, of which the following is a specification.

This invention relates to improvements in ophthalmic lenses and has particular reference to an improved construction of corrected lens to give substantially correct vision throughout the entire normal field of vision, and further of an improved process of manufacturing said lenses.

One of the leading objects of the present invention is the provision of improved ophthalmic lenses which may be readily manufactured as a satisfactory and usable commercial product without exorbitant cost to the wearer, and which shall be so constructed as to correct astigmatism only, or both astigmatism and focal error of the wearer throughout the entire normal visual range by making one face of several different powers of lenses with the same curve, whereby corrected lenses may be commercially manufactured, sold and fitted to the wearer practically as easily, quickly and cheaply as the old uncorrected commercial lenses.

A further object of the present invention or discovery consists in so determining the curves of the lens blanks that blanks may be put out by the manufacturer, several powers of the lenses having the same base curve, in semi-finished condition, that is, with one surface at least ground and polished ready for use and with such a curve on the polished side that by grinding of different curves on the opposite sides lenses may be produced which for a given condition, as for example for distant vision or for near vision, the entire lens will properly correct the astigmatism or if desired the astigmatism and focal errors both of the wearer throughout the entire normal field of vision in place of giving the proper correction at the center only and introducing an astigmatic error or astigmatism and focal errors at the edge, as is generally the case with the present commercial lenses.

Another object of the present invention is the provision of an improved construction of lens which will not only properly correct the astigmatism of the wearer throughout the entire normal field of vision of the lens, but which will in addition give approximately the same spherical value throughout the entire lens in place of a considerable variation in the spherical value, as has hitherto been the case in those lenses in which an attempt has been made to render the same astigmatically correct.

Other objects and advantages of our improvements in lenses should be readily apparent by reference to the following specification taken in connection with the accompanying drawings, and it will be understood that we may make any modifications in or departures from the specific features hereinafter disclosed within the scope of the appended claims without departing from or exceeding the spirit of our invention.

Figure I represents a vertical sectional view of one of our improved lenses for distant vision, taken on line I—I of Fig. II.

Fig. II represents a similar view of Fig. I taken in a horizontal plane on line II—II of Fig. I.

Fig. III represents a view corresponding to Fig. I, of a present commercial lens of corresponding central focal power taken on line III—III of Fig. IV.

Fig. IV represents a sectional view of Fig. III corresponding to Fig. II and taken on line IV—IV of Fig. III.

Fig. V represents a view corresponding to Fig. I, of another of our improved lenses.

Fig. VI represents a similar view of a commercial lens with corresponding central focal power of that of Fig. V.

Fig. VII represents a lens having the same power as in Fig. I, but for near vision, section taken on line VII—VII of Fig. VIII.

Fig. VIII represents a sectional view of Fig. VII taken on line VIII—VIII of Fig. VII.

In our consideration of the present methods of manufacture of commercial lenses and of the past efforts to produce lenses marginally corrected for astigmatism leading up to our present invention or discovery, it was discovered that the normal field of vision falls within an angle of about sixty degrees all around and that the greatest number of optical defects require for their correction lenses falling within the limits of about minus 7 diopters to plus 7 diopters, and it was further discovered that for a given type of work, as for reading or for near vision work or for distant vision, a single base curve or surface could be adopted which would be common to a great number of these average lenses within the wide range just mentioned, and that lenses with their anterior curves having the proper relationship to the fixed base curve and with suitable allowance made for thickness could be manufactured, all of which lenses, as mentioned, would possess this standard base curve, and on account of the possession of this standard base curve for the desired type of vision would have a difference between the astigmatism or astigmatism and focal error at the center and at an angle of 30 degrees or in the marginal zone of the 60 degree limit of ordinary vision less than the smallest measure ordinarily employed in the testing of eyes for astigmatic and focal visual defects and would, therefore, be for ordinary practical purposes correct throughout the entire range of vision, or correct to a degree that the variance would pass unnoticed in the average eye. In addition the lens could be so constructed as regards this standard base curve that in place of a wide variance in the spherical power at different points, as has been the case in previous lenses in which it was attempted to render them astigmatically correct, the spherical power would be substantially the same both at the vertex and in the marginal zone. In this way the whole series of corrected lenses could be made with a very small number of selected base curves, thereby making commercial manufacture practicable and avoiding the grinding of each lens specially to prescription, as has been the practice hitherto.

One of the main features of our invention is the making of several lenses of different powers with one face having the same curve and relating the opposite side thereto in such a way as to reduce marginal errors below a point injurious to vision. The constant base curves are selected to produce finished lenses in which the marginal errors of astigmatism or of focus and astigmatism are proportioned to give a variation from the central power of an amount not injurious to vision and greatly superior to that of present commercial lenses.

In our invention one side of many different powers of lenses may be made with the same curve, which we have designated the base curve. In this way a single blank or semi-finished lens is adaptable for any one of several powers of lenses and this base curve may apply to several lenses in a continuous section of the usable series, or to several lenses in separated portions of the series, and also to lenses of different character.

It is also one of the features of our invention to adapt our base curve constant to the correction both of aberrations in focal or spherical power and aberrations in astigmatic or cylindrical power or if desired only aberrations of astigmatism.

With our invention we have found that we can correct the marginal errors of practically all lenses within the usable limits to amounts less than the various lenses vary from their adjacent neighbors in axial power and the greater proportion of them to less than one-eighth of a diopter. In a few of the extreme numbers for the strong curves it may be necessary to exceed this amount, but with our invention they will be greatly improved over the present commercial lenses and the benefits of our invention will still hold true. In commercial lenses hitherto produced it has been realized that in the strong powers the variations in marginal power from the central power were very large, due to the inherent nature of the sharp curves, hence the larger errors were considered permissible and necessary. In our invention these errors have been greatly reduced.

In the drawings, the numeral 1 designates the base surface of the lens, or in other words, the curve adapted to be disposed on several different powers of lenses, while the numeral 2 designates the anterior or front surface of the lens. In some instances the side of the lens that comes next to the eye will be the base curve, while in others the side away from the eye will be the base curve; as for instance, the stronger negative lenses may be ground on the side away from the eye and the stronger positive lenses on the side nearest the eye.

As should be best appreciated by reference to Figs. III, IV and VI, it will be noted that in the case of the prior art lenses here illustrated the base surfaces 1 vary greatly from each other.

On the other hand, it will be noted by a comparison of Figs. I, II and V, that these surfaces have corresponding curvatures and that consequently the relationship of the base surface of the lens to the eye of the wearer is a predetermined one and will remain unvaried with varying anterior curves, as may be required to produce the desired prescriptive value in a lens.

Attention is here invited to the fact that this base curve is preferably formed as a constant for a particular type of vision, as for near vision or for far vision, but that a different constant is employed for near vision from that employed for far vision, as should be understood by a comparison of Figs. I and II designed for far vision, with corresponding Figs. VII and VIII which have been designed to take care of near vision work.

As is indicated in the drawings, up to the present discovery it has been customary to manufacture optical lenses with varying curves on both the ocular and anterior surfaces, these curves being more or less arbitrarily selected to produce the desired focal value in the completed lens, and being ordinarily selected without any regard to maintenance of the same correction for astigmatism at the edge of the lens as at the center, and to keep the spherical power of the lens substantially constant in both positions as well.

It has naturally occurred in this connection that a few lenses out of a very wide range would have the same astigmatic value and focal power at the vertex and also in the marginal regions which might ordinarily be considered within the range of about 60 degrees each way from the vertex. The large percentage of lenses, however, do not have these values.

Taking for example the commercial lens illustrated in Figs. III and IV of the drawings, having a power of plus 4 sphere combined with a plus .50 cylinder, which by the way is one of the most used cylinder corrections made, this lens in the usual commercial form is ground with a base surface having a minus 2 curve and with an anterior surface in the form of a torus, having respectively the powers of plus 6 diopters in the one meridian and plus 6.50 diopters in the other principal meridian. It will be noted that the resultant lens has the desired power, namely, a plus 4 sphere with a plus .50 cylinder addition at its vertex. A careful measurement of the focal values of the lens, however, shows that at 30 degrees from the axis there is an additional .68 or total of 1.18 diopters astigmatism when looking horizontally, but vertically there is only 0.05 diopter astigmatism, a very serious defect and greatly interfering with the vision of the wearer, since looking one way the wearer is overcorrected by 0.68 diopter and the other way under corrected by 0.45 diopters. This lens is merely one example of a large number of lenses in commercial use at the present time, which while entirely satisfactory so long as the vision is through the central part only of the lens do not give satisfactory visual correction when the wearer is looking through the margin of the lens.

Hitherto this result, that is, the marginal correction of a lens for astigmatic defects, has been considered a quite difficult, if not impossible, and a very expensive proposition. In the attempt to attain this result calculations have been made of value only for individual lenses, requiring special curves to be ground on both sides of the lens in the attempt to attain this correction, frequently even requiring toric curves or opposed toric curves on both surfaces of the lens to remove the marginal astigmatism, while even under these conditions the limit of marginal astigmatism has been relatively large.

By the use of the present discovery, however, it is possible to produce lenses corrected for the equality of astigmatism between the vertex and margin at but a slight relatively increased cost over ordinary lenses, and to produce these in a commercially practicable and satisfactory manner, which will permit of the average optical dealer carrying the lenses in stock in partially finished condition and readily making up individual prescriptions as ordered.

One of the essential features of this discovery, therefore, resides in the fact that for a certain vision, that is to say, either for near vision or for distant vision a certain standard base curve may be adopted, this curve being determined by the relationship between the object and the lens and between the lens and the center of rotation of the eye, and that by properly proportioning the anterior curve or curves relative to its base curve all lenses within the limits of normal visual defects found in the average eye may be constructed, which lenses will be optically correct at their vertex and which will vary but slightly from the vertex focal value at their marginal zone 30 degrees to either side of the vertex. This variance in astigmatic correctness can, if desired, be kept less than ¼th of a diopter, the smallest value usually considered in the fitting of ophthalmic lenses, and an amount too small to noticeably affect the vision so that for all practical purposes the entire lens may be considered as optically correct.

The practical result of this discovery is that lenses constructed in accordance with it may all be ground to the predetermined base curves, one set for near vision and one set for distant vision, on the one side and to the curve or curves necessary to satisfy the prescriptions on the other side, and when completed will provide lenses properly aiding and correcting the entire vision of the wearer within a normal 60 degree range, a result never before attempted to be obtained with regular ophthalmic lenses, and as previously mentioned, attained only in special instances or by the construction of specially figured curves differing for each lens and upon both sides of the lens.

As before mentioned, only a few lenses have been correct because of their small variation from a no power lens or because ground to a particular and individual prescription, and have hence never been a true commercial product but only a prescription matter, while with the present discovery on the other hand all the lenses of a series have a constant base curve for distant vision and a constant base curve for near vision, and may be readily ground up in the factory and put out in either semi-finished or entirely finished condition and will properly correct the entire vision of the wearer.

In the case of the example illustrated in Figs. III and IV the proper lens for the present requiring this prescription has been illustrated in Figs. I and II, in which the lens is shown as having an ocular curve of about minus 6.50 combined with anterior curves of about plus 10.308 and plus 10.789, respectively, the selected base curve surface in connection with the curves on the opposite side providing a lens with the proper astigmatic correction at the vertex and which in the present instance in place of more than ½ diopter astigmatic error in the margin has a marginal astigmatic error in one meridian of 0.00 diopter and in the other 0.06 diopters.

Similarly, in the case of the lenses shown in Figs. V and VI, our improved lens has the base curve 6.50 diopters as before, with the anterior curves $D'=7.400$, $D''=10.308$, giving the focal power of plus $1.00 \times$ plus 4.00 at the vertex and having an astigmatic error of 0.14 diopters in both meridians at the margin.

On the other hand, in the case of the present day commercial lens of corresponding focal value the ocular curve is plus 5.00 diopters, and the anterior curves are plus $6.00 \times$ plus 9.00, giving the same focal value at the vertex but presenting an astigmatic error of 0.26 and 0.12 in the margins.

These two examples have been chosen as characteristic of many others, and as illustrating the wide range of lenses which may be constructed in accordance with our invention or discovery and be properly astigmatically corrected as regards their margins, while at the same time illustrating the defects present in the ordinary commercial lenses together with the absence of any standard base curves for said lenses.

We have assumed in these examples a standard base curve of minus 6.50 diopters for distant vision and a standard ocular curve of minus 4.50 diopters for near vision.

We do not make any claim of being the originators of an ophthalmic lens corrected to a more or less limited extent as regards marginal astigmatism, as we realize that this has hitherto been attempted, nor do we consider or claim as falling within our invention any isolated instances in which ordinary commercial lenses prove so correct owing to their slight variation from our base constants or from no power lenses in their marginal portions, but we do claim to be the first to construct lenses for the correction of optical defects in groups all having a standard base curve determined by a proper consideration of the relationship between the object and the lens, or in other words, the question of whether the lens is to be used for near or for distant vision, and the first to grind all lenses within the normal range of use, as for example between minus 7 diopters and plus 7 diopters, with one selected set of base curves for distance, and one set for near use, and with varying anterior curves according to the focal value desired, and we do claim to be the first discoverers of the fact that by the proper choice of two standard sets of base curves and the grinding according to the usual rules of lens construction of curves on the opposite side which will produce the desired vertex focal value the lens will come out corrected both as to its spherical and cylindrical powers for a 60 degree visual angle to within ⅛ diopters or the smallest measure of power normally used in the testing and correction of vision.

To facilitate the selection of semi-finished blank to be made up into the finished corrected lens we may apply thereto designations indicating the effective limits within which it may be employed to produce marginally corrected lenses.

It is further to be understood that while we have here specifically described an embodiment of our improvement adapted to take care of a range of lenses between 7 diopters minus lenses and plus 7 diopters lenses, that these are by no means the necessary limits as we can reduce the marginal error to a much smaller amount if desired by making use of two or more base curves for different portions of the range and similarly may greatly increase the range by the addition of one or more supplemental base curves to take care of lenses above or below the present described range, both of which features we deem as falling within the purview of our invention.

More specifically what we claim as new and novel is:

1. An ophthalmic lens series having a range of several powers in which each of the lenses of the series has the same base curve, and in which the relationship of the anterior curve or curves to the base curve reduces the astigmatic difference between the axial and the marginal portions of the lens to below a predetermined standard fraction of a diopter, which standard is constant for the series.

2. An ophthalmic lens series having a range of several powers comprising units each having the same base curve and having anterior curves ground to fulfil the particular prescription and each fulfilling the astigmatism of the lens within ⅛ diopters for a 60 degree visual angle.

3. The process of manufacturing ophthalmic lenses consisting in establishing a constant base curve and a constant limit of marginal astigmatism, and grinding the lens with an anterior surface producing the requisite axial focal power and fulfilling the marginal astigmatic requirements for a visual angle of 60 degrees.

4. The process of manufacturing ophthalmic lenses, consisting in establishing a constant base curve for a selected visual use and grinding on the opposite side of the lens in accordance with the established grinding practice the necessary curve or curves to produce the desired axial focal value in the completed lens, whereby the entire lens when completed will be corrected for marginal astigmatism within ⅛ diopters.

5. The process of commercially manufacturing ophthalmic lenses consisting in grinding a plurality of blanks with the same concave base surface for a given type of vision and subsequently grinding on the opposite side of the blank a convex anterior surface whose curve or curves have been selected according to the regular rules of optical lens grinding as regards the base curve, to produce the desired axial focal value for the lens whereby the several lenses when completed will each have the same base curve and will be corrected for marginal astigmatism to within ⅛ of a diopter.

6. The process of manufacturing ophthalmic lenses, consisting in establishing a standard base curve for a given type of vision, determining the effective limits of said base curve, grinding lens blanks to produce the determined base curve thereon, and applying designations to the blank indicating the effective limits within which it may be employed to produce marginal astigmatically corrected lenses.

7. An ophthalmic lens whose base is a constant for several powers of lenses and its opposite surface a variable and whose base and opposite surfaces are related to give the required axial powers and marginal powers of focus and astigmatism within the normal angle of vision which vary from the axial powers by an amount less than lenses in the corresponding section of the ophthalmic series vary from each other.

8. A commercial ophthalmic lens, the base surface of which is a constant for several powers of marginally corrected lenses and the opposite surface of which is related to the base surface to give the required axial powers and marginal powers of focus and astigmatism within the normal angle of vision which vary from the axial powers by an amount less than lenses in the corresponding section of the ophthalmic series vary from each other.

9. A commercial ophthalmic lens, the base surface of which is a constant for several powers of marginally corrected lenses and the opposite surface of which is related to the base surface to give the required axial powers and marginal power of astigmatism within the normal angle of vision which varies from the axial power of astigmatism by an amount less than the astigmatism in lenses in the coresponding section of the ophthalmic series varies from each other.

10. An opthalmic lens whose base is a constant for several powers of lenses and its opposite surface a variable and whose base and opposite surfaces are related to give the required axial powers of focus and astigmatism, and the marginal powers of astigmatism and focus within the normal angle of vision are both adjusted to vary from the axial powers by an amount less than lenses in the corresponding portion of the ophthalmic series vary from each other.

11. An ophthalmic lens the base surface of which is a constant for several powers of marginally corrected lenses whose base and opposite surfaces are related to give the required axial powers of focus and astigmatism, and the marginal powers of astigmatism and focus within the normal angle of vision are both adjusted to vary from the axial powers by an amount less than lenses in the corresponding portion of the ophthalmic series vary from each other.

12. A series of ophthalmic lenses of different powers each lens of which has the same base surface and whose base and opposite surfaces are related to give the required axial powers and marginal powers of focus and astigmatism within the normal angle of vision which vary from the axial powers by an amount less than lenses in the corresponding section of the ophthalmic series vary from each other.

13. A series of ophthalmic lenses of different powers each lens of which has the same base surface and whose base and opposite surfaces are related to give the required axial powers and marginal power of astigmatism within the normal angle of vision which varies from the axial power of astigmatism by an amount less than the astigmatism in lenses in the corresponding section of the ophthalmic series varies from each other.

14. The process of manufacturing ophthalmic lenses consisting in determining the approximate limits of average visual defects, calculating fixed base lens surfaces and opposite surfaces, the relationships of which are such as to give the correct axial powers of focus and astigmatism and a variation therefrom for a sixty degree visual angle in the margin of less than lenses in the corresponding section of the ophthalmic series vary from each other, and finishing lens blanks to the base curves of said surfaces.

15. The process of manufacturing ophthalmic lenses consisting in determining the approximate limits of average visual defects, calculating fixed base lens surfaces and opposite surfaces, the relationships of which are such as to give correct axial powers and a variation from the axial astigmatic power for a sixty degree visual angle in the margin of less than lenses in the corresponding section of the ophthalmic series vary from each other, and finishing lens blanks to the base curves of said surfaces.

In testimony whereof we affix our signatures in the presence of two witnesses.

HARRY W. HILL.
EDGAR D. TILLYER.
HARRY H. STYLL.

Witnesses:
  EDITH M. HALVORSEN,
  J. JOSEPH MACCARTHY.